United States Patent
Crocker et al.

(10) Patent No.: US 7,051,788 B2
(45) Date of Patent: May 30, 2006

(54) COMMON AIR MIX CHAMBER

(75) Inventors: Glenn Crocker, Marietta, GA (US); Tim Roland, Clarkston, MI (US)

(73) Assignee: Denso International America, Inc., Southfield, MI (US)

(*) Notice: Subject to any disclaimer, the term of this patent is extended or adjusted under 35 U.S.C. 154(b) by 0 days.

(21) Appl. No.: 10/926,546

(22) Filed: Aug. 26, 2004

(65) Prior Publication Data

US 2006/0042779 A1 Mar. 2, 2006

(51) Int. Cl.
*B60H 3/00* (2006.01)
*B60H 1/00* (2006.01)
*F25B 29/00* (2006.01)

(52) U.S. Cl. .......... 165/42; 165/43; 165/202; 165/76; 165/78; 165/137; 454/156; 454/160; 454/161; 454/338

(58) Field of Classification Search .......... 454/338, 454/160, 156, 161; 165/202, 42, 43, 76, 165/78, 137
See application file for complete search history.

(56) References Cited

U.S. PATENT DOCUMENTS 5,934,989 A * 8/1999 Yamamoto .......... 454/156
6,575,701 B1 * 6/2003 Kamiya et al. .......... 454/139

FOREIGN PATENT DOCUMENTS

EP 816145 A2 * 1/1998
JP 11001115 A * 1/1999

* cited by examiner

*Primary Examiner*—John K. Ford
(74) *Attorney, Agent, or Firm*—Harness, Dickey & Pierce, PLC (57) ABSTRACT

An HVAC assembly includes an HVAC case having a first inlet adapted to accept air in a first configuration suitable for a right hand drive vehicle and a second inlet adapted to accept air in a second configuration suitable for a left hand drive vehicle. The HVAC case includes at least one outlet for delivering air to a vehicle cabin. A deflector plate is adapted to cooperate with the HVAC case in the first configuration whereby the deflector plate allows air to pass through the first inlet and inhibits air passage through the second inlet. The air deflector plate is adapted to cooperate with the HVAC case in the second configuration whereby the deflector plate allows air to pass through the second inlet and inhibits air passage through the first inlet.

20 Claims, 6 Drawing Sheets

COMMON AIR MIX CHAMBER

FIELD OF THE INVENTION

The present invention relates to HVAC systems in vehicles and more particularly to an HVAC case assembly for use with a right hand drive vehicle in a first configuration and a left hand drive vehicle in a second configuration.

BACKGROUND OF THE INVENTION

In automotive vehicles, it is common to have a climate control system located within an instrument panel which provides heated or cooled air to occupants through dash panel defrost air outlets, instrument panel venting air outlets and floor directed air outlets. These traditional climate control systems often include a heater core that performs heat exchange between the engine coolant, which is heated by the engine, and the cool air in the cabin/outside environment, in order to provide warm air to the passenger compartment. Some vehicles include an air conditioning system that cooperates with an evaporator for absorbing heat from the air in the vehicle. The heater core and evaporator are typically provided in an HVAC case located in the passenger compartment of the vehicle.

In some instances, vehicles are manufactured for both a left hand drive version and a right hand drive version to accommodate global markets. As a result, a number of vehicle modules such as instrument clusters, steering columns and other components must be configured to adapt for use on each side of the vehicle or alternatively be designed entirely or partly as unique components. In general it is expensive for tooling, production, assembly and inventory to provide a first set of components for use on a left hand drive vehicle and a second set of components for use on a right hand drive vehicle. Therefore it is desirable to provide vehicle modules that may be easily adapted for use in a right or left hand drive vehicle.

SUMMARY OF THE INVENTION

An HVAC assembly includes an HVAC case having a first inlet for accepting air in a first configuration suitable for a right hand drive vehicle, a second inlet for accepting air in a second configuration suitable for a left hand drive vehicle and at least one outlet for delivering air to a vehicle cabin. A deflector plate is adapted to cooperate with the HVAC case in the first configuration whereby the deflector plate allows air to pass through the first inlet and inhibits air passage through the second inlet. The air deflector plate is adapted to cooperate with the HVAC case in the second configuration whereby the deflector plate allows air to pass through the second inlet and inhibits air passage through the first inlet.

According to other features, the first and second inlets are symmetrically offset from a midplane defined through the HVAC case. The HVAC case defines a wall extending between the first and second inlets. The deflector plate is adapted to press against the wall and extend toward the second inlet in the first configuration. The deflector plate is adapted to press against the wall and extend toward the first inlet in the second configuration. The deflector plate defines a distal end portion for pressing against the wall and a proximal end portion for inhibiting air from passing through the second inlet in the first configuration and inhibiting air from passing through the first inlet in the second configuration. The deflector plate is adapted to slidaby pass through the second inlet of the HVAC case in the first configuration and slidably pass through the first inlet of the HVAC case in the second configuration.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
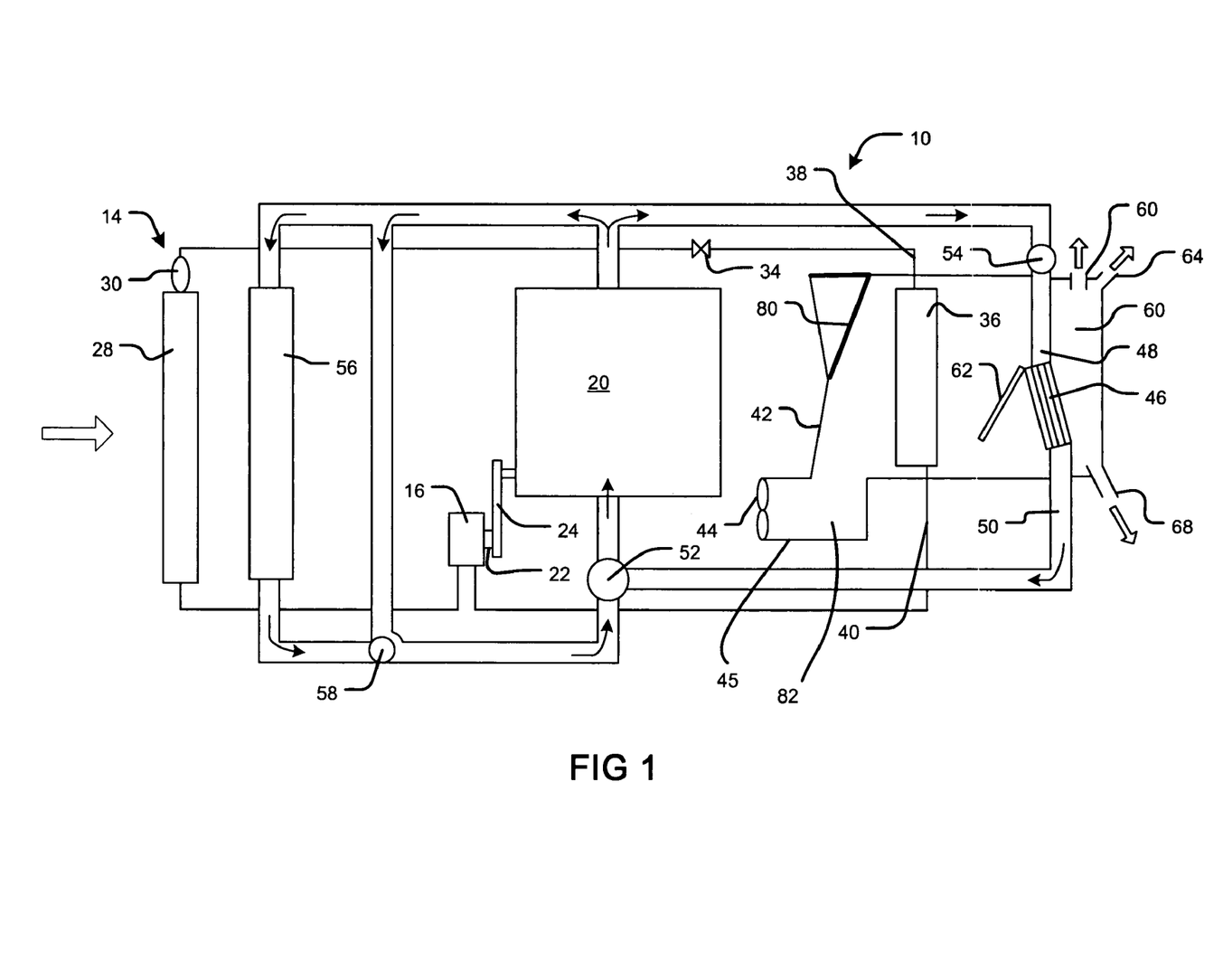
FIG. 1 is a functional block diagram of an HVAC system according to the present invention shown configured for use in a right hand drive vehicle.

With initial reference to FIG. 1, a block diagram of a conventional vehicle HVAC system is shown and generally identified at reference 10. A refrigeration cycle R of the vehicle HVAC system 10 includes an air-cooling system 14. The air-cooling system 14 includes a compressor 16 which draws, compresses, and discharges a refrigerant. The power of a vehicle engine 20 is transmitted to the compressor 16 through pulleys 22 and a belt 24.

As is well known, the vehicle engine 20 drives not only the air conditioning compressor 16 but also such auxiliaries as a generator, a hydraulic pump for a power steering unit, and a coolant pump via belts and other power transmitting devices.

In the refrigeration cycle R, the compressor 16 discharges a superheated gas refrigerant of high temperature and high pressure, which flows into a condenser 28. Here, heat exchange is performed with the outside air sent by a cooling fan (not shown), so that the refrigerant is cooled for condensation. The refrigerant condensed in this condenser 28 then flows into a receiver 30, in which the refrigerant is separated into a gas and a liquid. A redundant liquid refrigerant in the refrigeration cycle R is stored inside the receiver 30.

The liquid refrigerant from the receiver 30 is decompressed by an expansion valve 34 into a gas-liquid double phase state of low pressure refrigerant. The low pressure refrigerant from the expansion valve 34 flows into an evaporator 36 by way of an inlet pipe 38. The evaporator 36 is arranged inside an HVAC case 42 of the vehicle air conditioning system 14. The low pressure refrigerant flowing into the evaporator 36 absorbs heat from the air inside the HVAC case 42 for evaporation. An outlet pipe 40 of the evaporator 36 is connected to the suction side of the compressor 16, so that the cycle components mentioned above constitute a closed circuit.

The HVAC case 42 forms a ventilation duct through which air conditioning air is sent into the vehicle cabin or passenger compartment. The HVAC case 42 contains a fan 44 which is arranged on the upstream side of the evaporator 36. An inside/outside air switch box (not shown) is arranged on the suction side of the fan 44 (left of the fan 44 as viewed from FIG. 1). The air inside the passenger compartment (inside air) or the air outside the passenger compartment (outside air) switched and introduced through the inside/outside air switch box is sent into the HVAC case 42 through an entrance duct 45 by the fan 44.

The HVAC case 42 accommodates, on the downstream side of the evaporator 36, a hot water heater core (heat exchanger) 46. The heater core 46 includes an inlet pipe 48 and an outlet pipe 50. Hot water (coolant) of the vehicle engine 20 is directed to the heater core 46 through the inlet pipe 48 by a water pump 52. A water valve 54 controls the flow volume of engine coolant supplied to the heater core 46. A radiator 56 and a thermistor 58 further cooperate to control the temperature of the coolant.

A bypass channel 60 is formed beside the hot water heater core 46. An air mix door 62 is provided to adjust the volume ratio between warm air and cool air that passes through the hot water heater core 46 and the bypass channel 60, respectively. The air mix door 62 adjusts the temperature of the air blown into the passenger compartment by adjusting the volume ratio between the warm air and cool air.

Additionally, a face outlet 64, a foot outlet 68, and a defroster outlet 70 are formed at the downstream end of the HVAC case 42. The face outlet 64 directs air toward the upper body portions of passengers, the foot outlet 68 directs air toward the feet of the passengers, and the defroster outlet 70 directs air toward the internal surface of a windshield. The outlets 64, 58 and 70 are opened and closed by outlet mode doors (not shown). The air mix door 62 and the outlet mode doors mentioned above are driven by such electric driving devices such as servo motors via linkages or the like.

As will be described in greater detail below, the HVAC case 42 according to the present teachings may be employed in either a right hand drive (RHD) vehicle or a left hand drive (LHD) vehicle. The schematic diagram depicted in FIG. 1 illustrates the HVAC case 42 configured for use in a RHD vehicle. The HVAC case 42 cooperates with an air deflector plate 80 to direct air from the entrance duct 45 toward the evaporator 36. As will be discussed herein, the air deflector plate 80 may be inserted into the HVAC case 42 in a first orientation (FIGS. 1 and 3) for directing air toward the evaporator 36 in a RHD vehicle or a second orientation (FIG. 5) for directing air toward the evaporator 36 in a LHD vehicle.

Figure 2:
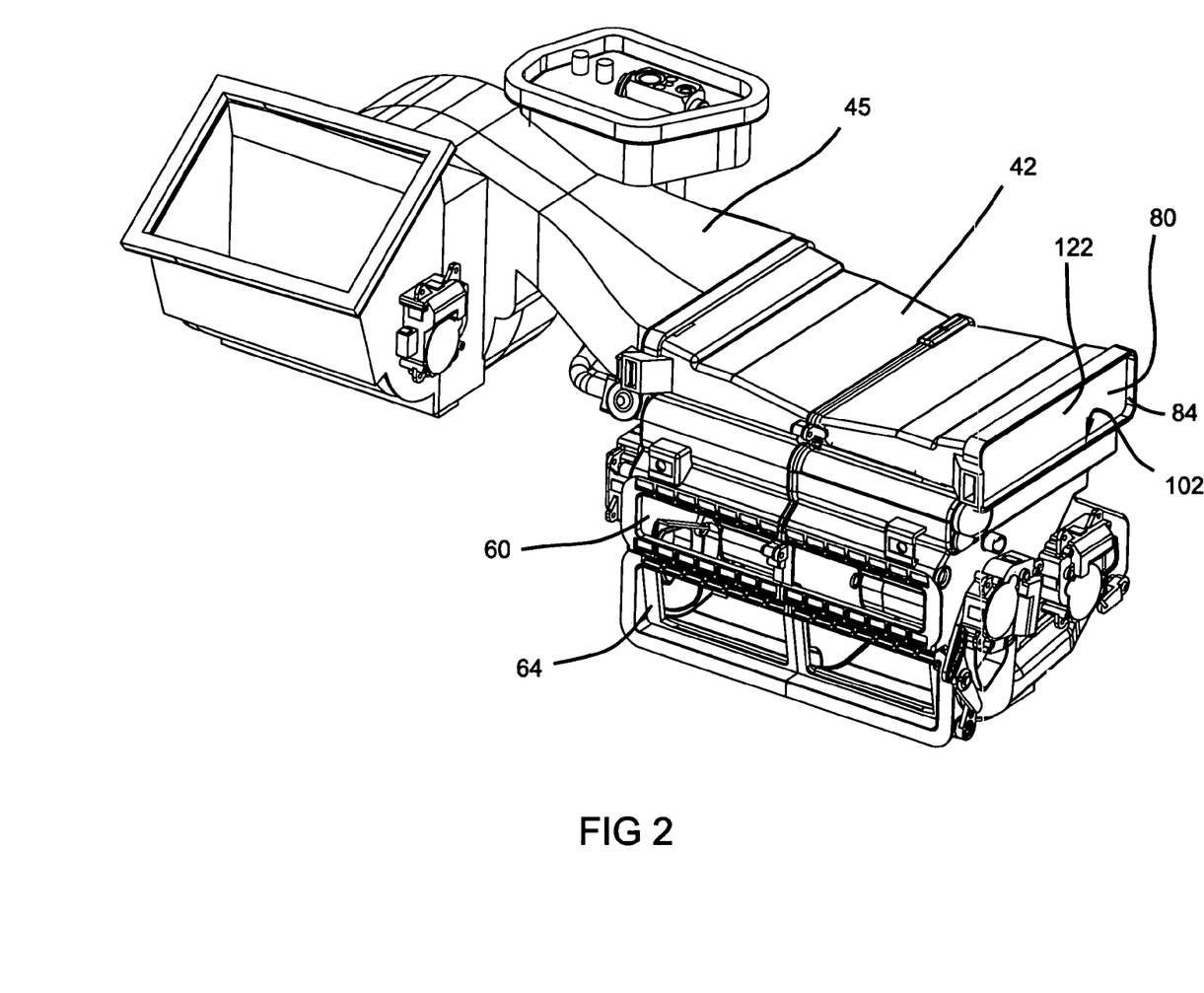
FIG. 2 is a perspective view of an HVAC case according to the present invention shown configured for use in a right hand drive vehicle.
Figure 3:
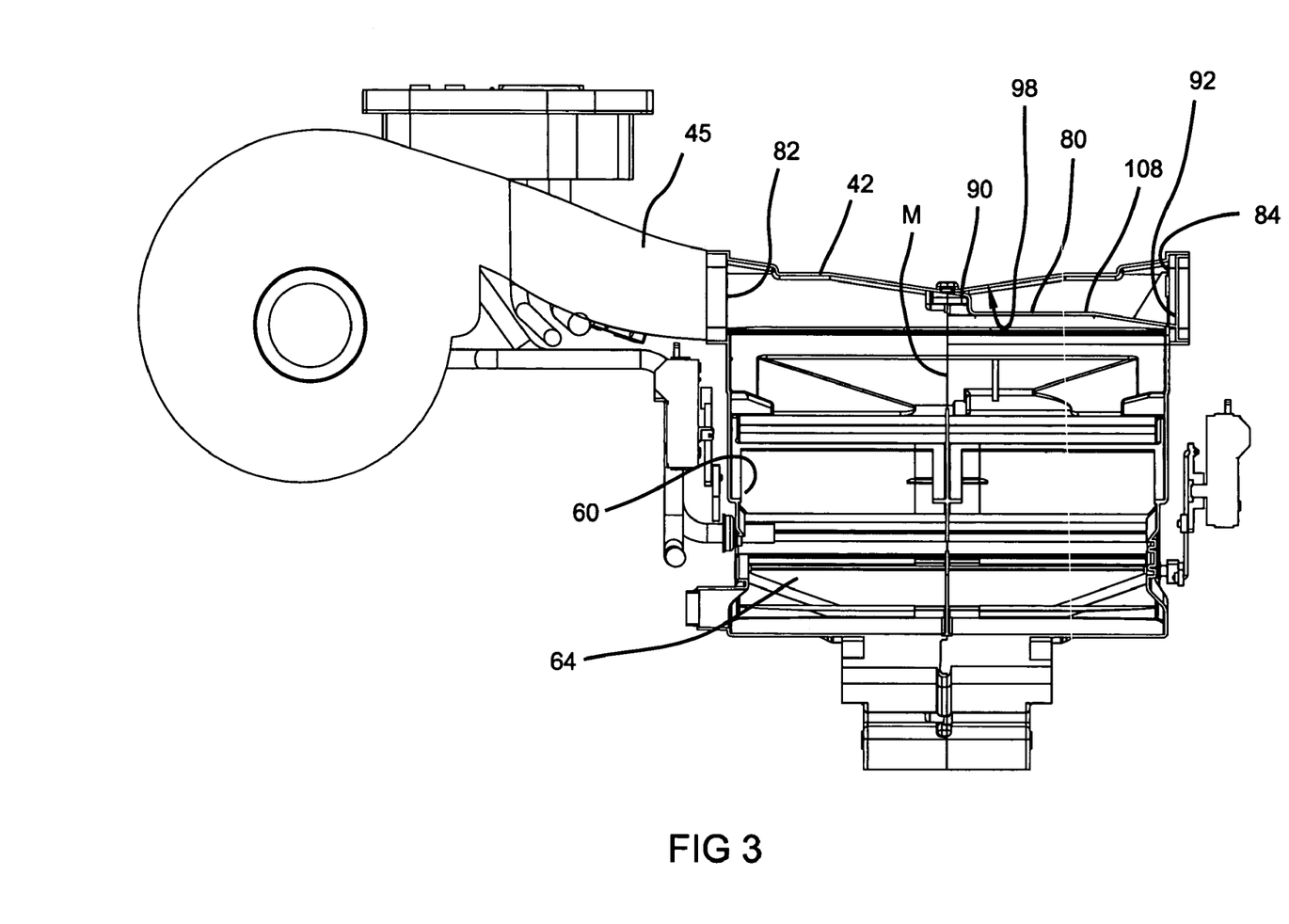
FIG. 3 is a top view of the HVAC case of FIG. 2 shown with a deflector plate oriented in a first position for use in a right hand drive vehicle.

With continued reference to FIG. 1 and further reference to FIGS. 2 and 3, the HVAC case 42 will be described as configured for use in a RHD vehicle. The HVAC case 42 defines a first opening or inlet 82 and a second opening or inlet 84. The HVAC case 42 is symmetric with respect to the first and second inlets 82 and 84 such that the deflector plate may be easily accommodated for use in the first or second orientation. The deflector plate 80 is adapted to be positioned in the HVAC case 42 in the first orientation to accept air through the first inlet 82 while inhibiting air from passing through the second inlet 84. In the first orientation, the deflector plate directs air entering the HVAC case 42 through the first inlet 82 toward the evaporator 36. The entrance duct 45 is suitably coupled to the HVAC case 42 at the first inlet 82. As best illustrated in FIG. 3, the deflector plate 80 is positioned in the HVAC case 42 such that a distal end portion 90 is pressed against a lateral wall 98 of the HVAC case 42 and a proximal end portion 92 extends around a wall 102 (FIG. 2) defining the second inlet 84. An intermediate portion 108 of the deflector plate 80 extends between the distal end portion 90 and the proximal end portion 92 and is generally angled to direct air toward the evaporator 36.

Figure 4:
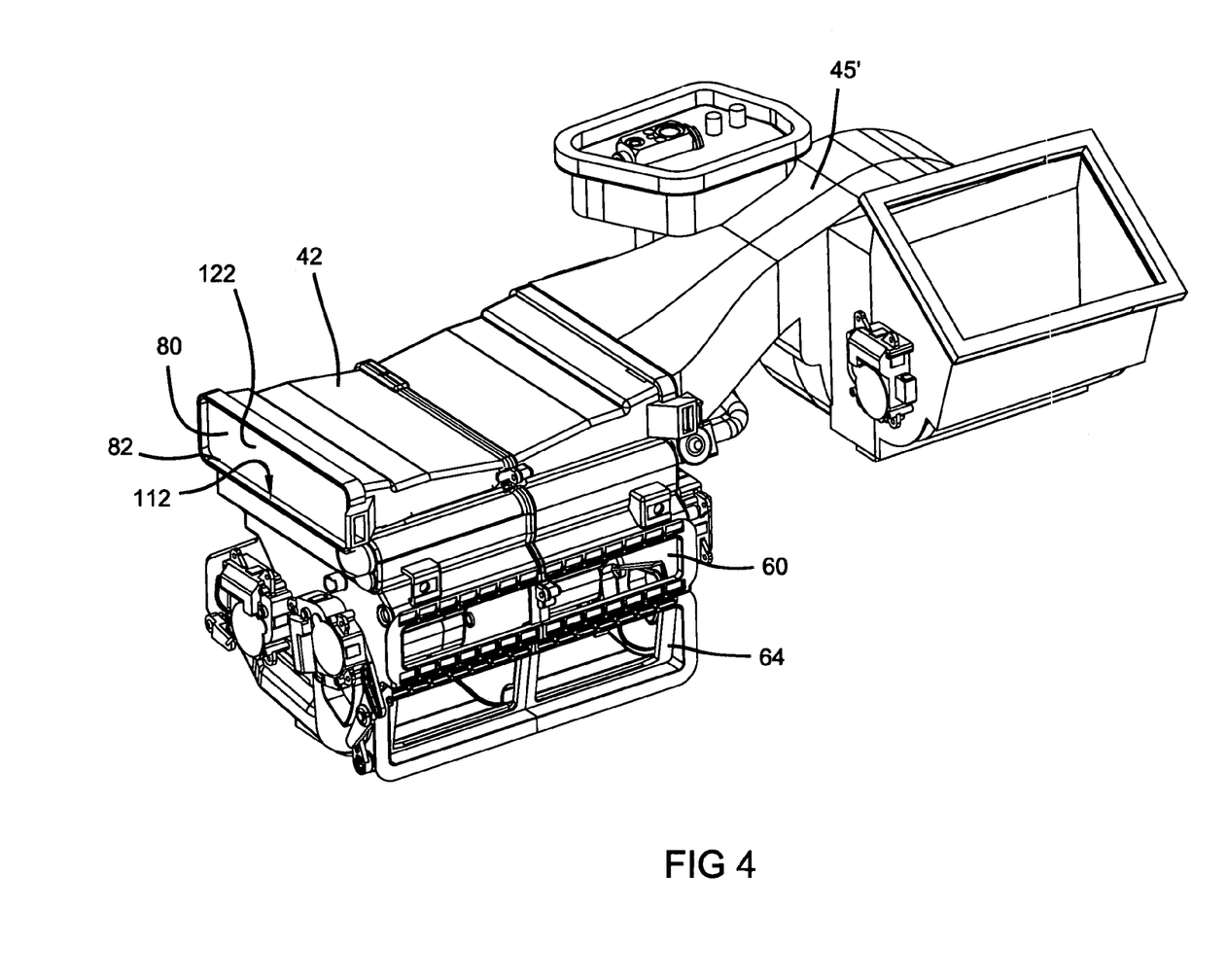
FIG. 4 is a perspective view of the HVAC case of FIG. 2 according to the present invention shown configured for use in a left hand drive vehicle.
Figure 5:
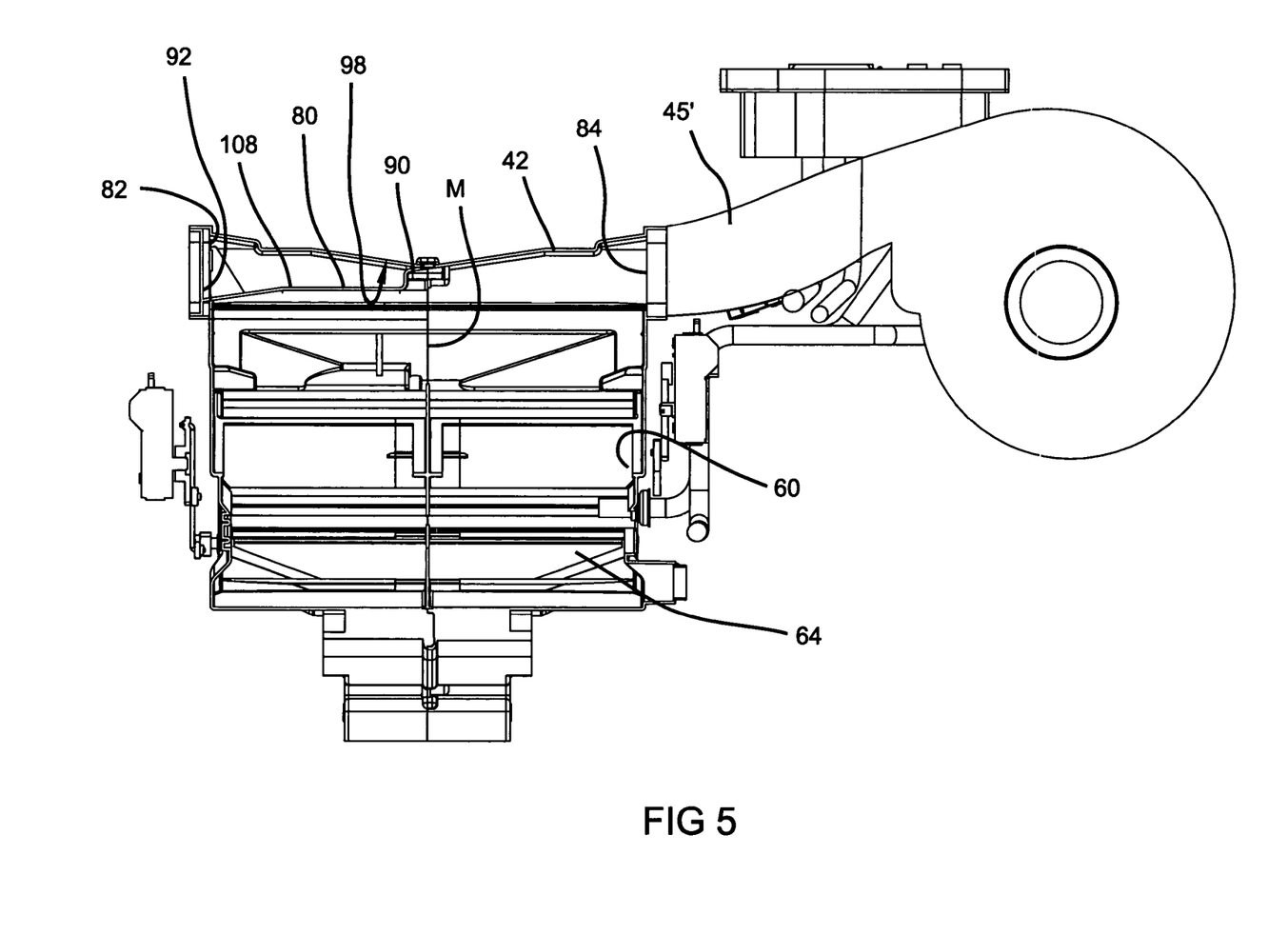
FIG. 5 is a top view of the HVAC case of FIG. 4 shown with the deflector plate oriented in a second position for use in a left hand drive vehicle.

With reference now to FIGS. 4 and 5 the HVAC case 42 will be described as configured for use in a LHD vehicle. For a LHD vehicle an entrance duct 45' is used. The entrance duct 45' is symmetric to the entrance duct 45 used for a RHD vehicle (FIGS. 2 and 3). The deflector plate 80 is adapted to be positioned in the HVAC case 42 in the second orientation to accept air through the second inlet 84 while inhibiting air from passing through the first inlet 82. In the second orientation, the deflector plate 80 directs air entering the HVAC case 42 through the second inlet 84 toward the evaporator 36. The entrance duct 45' is suitably coupled to the HVAC case 42 at the second inlet 84. As best illustrated in FIG. 5, the deflector plate 80 is positioned in the HVAC case 42 such that the distal end portion 90 is pressed against the lateral wall 98 of the HVAC case 42 and the proximal end portion 92 extends around a wall 112 (FIG. 4) defining the first inlet 82.

Figure 6:
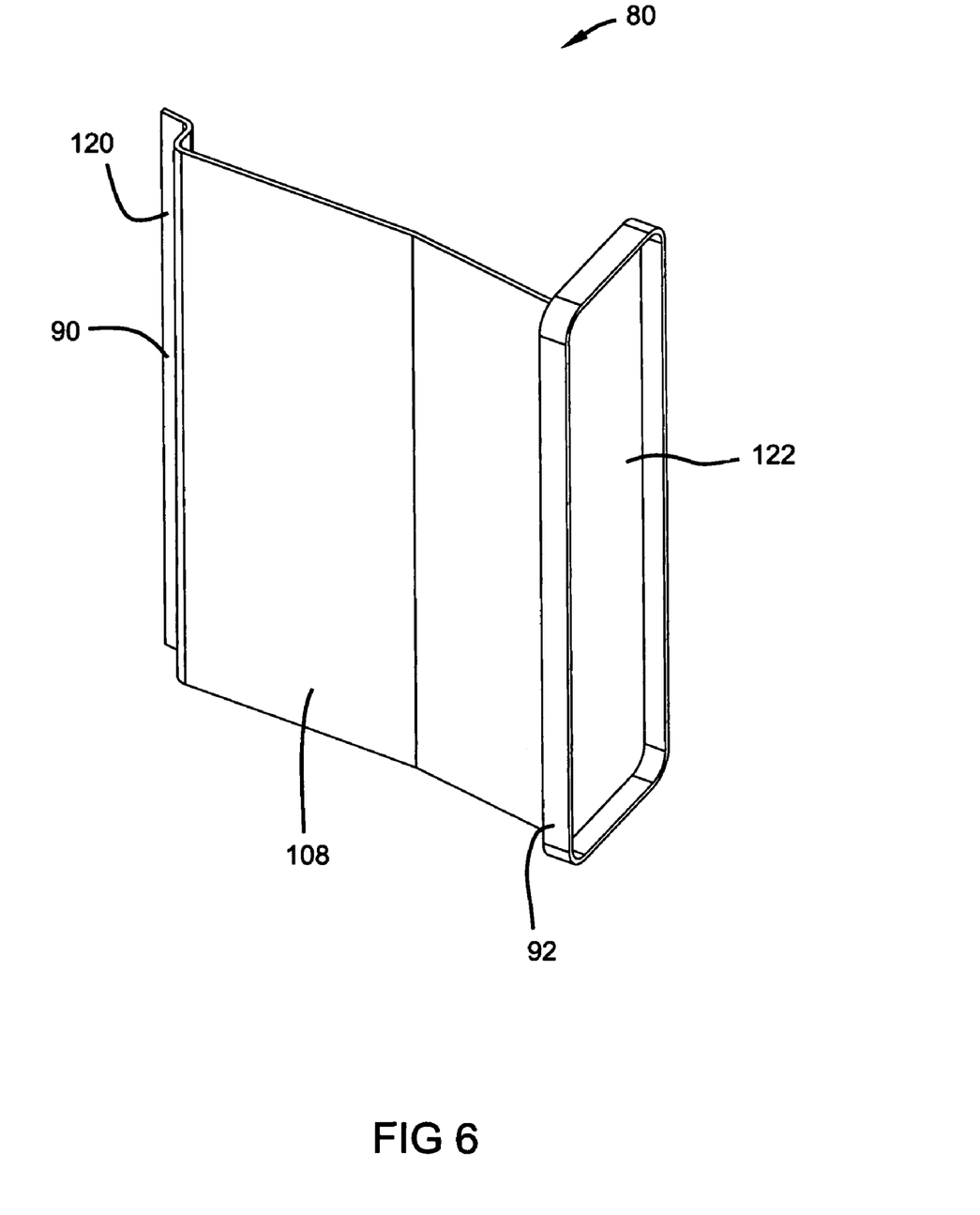
FIG. 6 is a perspective view of the deflector plate.

With reference now to FIG. 6, the deflector plate 80 will be described in greater detail. As explained, the intermediate portion 108 extends between the distal end portion 90 and the proximal end portion 92. A lip extends at the distal end portion 90 defining a longitudinal wall 120. A transverse wall 122 is configured at the proximal end portion 92. The transverse wall 122 is operable to extend between the wall 102 to block the second inlet 84 in the first orientation (FIGS. 2 and 3) and extend between the wall 112 to block the first inlet 82 in the second orientation (FIGS. 4 and 5). As illustrated in FIGS. 3 and 5, the HVAC case defines a midplane M through which the first and second inlets 82 and 84 are symmetrically offset. As a result, the deflector plate 80 is accepted securely by the HVAC case 42 in each of the first and second orientation. The deflector plate 80 may comprise a rigid lightweight material such as, but not limited to plastic. Those skilled in the art will appreciate that the dimensions and overall shape of the deflector plate 80 is merely exemplary and other shapes may be employed.

Configuration of the HVAC case 42 in the first orientation (FIGS. 2 and 3) will now be described. As explained, the HVAC case 42 and the deflector plate 80 may be used for the first orientation and the second orientation. For the first orientation, the distal end portion 90 of the deflector plate 80 is slidably inserted through the second opening 84 until the lip 120 engages the lateral wall 98 of the HVAC case 42 (FIG. 3). Once the lip 120 engages the lateral wall 98, the proximal end portion 92 mates with the wall 102 to form a seal thereat (FIG. 2). The entrance duct 45 is operably coupled to the HVAC case 42 at the first opening 82.

To configure the HVAC case 42 in the second orientation (FIGS. 4 and 5), the distal end portion 90 of the deflector plate 80 is slidably inserted through the first opening 82 until the lip 120 engages the lateral wall 98 of the HVAC case 42. Once the lip 120 engages the lateral wall 98, the proximal portion 92 mates with the wall 112 to form a seal thereat (FIG. 4). The entrance duct 45' is operably coupled to the HVAC case 42 at the second opening 84.

While the invention has been described in the specification and illustrated in the drawings with reference to various embodiments, it will be understood by those skilled in the art that various changes may be made and equivalents may be substituted for elements thereof without departing from the scope of the invention as defined in the claims. For example, the configuration of the HVAC case 42 is exemplary and other shapes may be employed for accommodating the deflector plate 80 in the first and second configuration. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An HVAC assembly comprising:
   an HVAC case having a first inlet adapted to accept air in a first configuration suitable for a right hand drive vehicle, a second inlet for accepting air in a second configuration suitable for a left hand drive vehicle and at least one outlet for delivering air to a vehicle cabin; and
   a deflector plate adapted to cooperate with said HVAC case in said first configuration whereby said deflector plate allows air to pass through said first inlet and inhibits air passage through said second inlet, and a second configuration whereby said deflector plate allows air to pass through said second inlet and inhibits air passage through said first inlet, said deflector plate further comprising:
   a first S-shaped end that resides adjacent an HVAC case midplane; and
   a second end that resides at said second inlet when said HVAC case is in said first configuration, and that resides at said first inlet when said HVAC case is in said second configuration;
   wherein said deflector plate resides only within one-half of the HVAC case as defined by said HVAC case midplane.

2. The HVAC assembly of claim 1 wherein said first and second inlets are symmetrically offset from said midplane defined through said HVAC case.

3. The HVAC assembly of claim 2 wherein said HVAC case defines a wall extending between said first and second inlets.

4. The HVAC assembly of claim 3 wherein said deflector plate is adapted to press against said wall and extend toward said second inlet in said first configuration.

5. The HVAC assembly of claim 3 wherein said deflector plate is adapted to press against said wall and extend toward said first inlet in said second configuration.

6. The HVAC assembly of claim 3 wherein said deflector plate defines a distal end portion for pressing against said wall and a proximal end portion for inhibiting air from passing through said second inlet in said first configuration and inhibiting air from passing through said first inlet in said second configuration.

7. The HVAC assembly of claim 3 wherein said deflector plate is adapted to slidably pass through said second inlet of said HVAC case in said first configuration and slidably pass through said first inlet of said HVAC case in said second configuration.

8. The HVAC assembly of claim 1 wherein said HVAC case houses an evaporator and a heater core therein.

9. An HVAC assembly comprising:
   an evaporator;
   an HVAC case housing said evaporator, said HVAC case comprising:
   a first inlet adapted to accept air therethrough and direct the air toward said evaporator in a first configuration;
   a second inlet adapted to accept air therethrough and direct the air toward said evaporator in a second configuration; and
   at least one outlet adapted to deliver air to a vehicle cabin; and
   an air deflecting member selectively located through one of said second inlet for inhibiting air passage through said second inlet in said first configuration and said first inlet for inhibiting air passage through said first inlet in said second configuration, said air deflecting member further comprising:
   a first S-shaped end that resides adjacent an HVAC case midplane; and
   a second end that resides at said second inlet when said HVAC case is in said first configuration, and that resides at said first inlet when said HVAC case is in said second configuration;
   wherein said deflector plate resides only within one-half of the HVAC case as defined by said HVAC case midplane.

10. The HVAC assembly of claim 9 wherein said first and second inlets are symmetrically offset from said midplane defined through said HVAC case.

11. The HVAC assembly of claim 10 wherein said HVAC case defines a wall extending between said first and second inlets.

12. The HVAC assembly of claim 11 wherein said air deflecting member presses against said wall and extends toward said second inlet in said first configuration.

13. The HVAC assembly of claim 11 wherein said air deflecting member presses against said wall and extends toward said first inlet in said second configuration.

14. The HVAC assembly of claim 11 wherein said air deflecting member defines a distal end portion for pressing against said wall and a proximal end portion for inhibiting air from passing through said second inlet in said first configuration and inhibiting air from passing through said first inlet in said second configuration.

15. The HVAC assembly of claim 11 wherein said air deflecting member is adapted to slidably pass through said second inlet of said HVAC case in said first configuration and slidably pass through said first inlet of said HVAC case in said second configuration.

16. The HVAC assembly of claim 11 wherein said HVAC case houses a heater core therein.

17. An HVAC case for use in one of a right hand drive vehicle and a left hand drive vehicle comprising:
   an HVAC case having a first inlet for accepting air in a first configuration for use in a right hand drive vehicle and a second inlet for accepting air in a second configuration for use in a left hand drive vehicle; and
   an air deflecting member in said HVAC case in a first orientation whereby said air deflecting member permits air passage through said first inlet and inhibits air passage through said second inlet in said first configuration;

said air deflecting member in said HVAC case in a second orientation whereby said air deflecting member permits air passage through said second inlet and inhibits air passage through said first inlet in said second configurations said air deflecting member further comprising:

a first S-shaped end that resides adjacent an HVAC case midplane; and a second end that resides at said second inlet when said HVAC case is in said first configuration, and that resides at said first inlet when said HVAC case is in said second configuration;

wherein said deflector plate resides only within one-half of the HVAC case as defined by said HVAC case midplane.

18. The HVAC case of claim 17 wherein said air deflecting member in said HVAC case has an insertion cross-section smaller than said first inlet or said second inlet cross-section.

19. The HVAC case of claim 18 wherein said air deflecting member includes a distal end portion of said air deflecting member against a top wall adjacent said HVAC case midplane and a proximal end portion across said first inlet or second inlet for inhibiting air passage.

20. The HVAC case of claim 17, further comprising:

a first HVAC case side; and a second HVAC case side, wherein said HVAC case sides are symmetrical and attached about said HVAC case midplane to form said HVAC case.

* * * * *